United States Patent
Arroyo et al.

(10) Patent No.: US 10,762,510 B2
(45) Date of Patent: Sep. 1, 2020

(54) MODIFYING A NUMBER OF OPPORTUNITIES IN A CUSTOMER RELATIONSHIP MANAGEMENT (CRM) SYSTEM

(71) Applicant: International Business Machines Corporation, Armonk, NY (US)

(72) Inventors: Jorge A. Arroyo, Carmel, IN (US); Stephen P. Kruger, Dublin (IE); Patrick J. O'Sullivan, Dublin (IE); Luciano Silva, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 793 days.

(21) Appl. No.: 14/449,600

(22) Filed: Aug. 1, 2014

(65) Prior Publication Data
US 2016/0034920 A1    Feb. 4, 2016

(51) Int. Cl.
*G06Q 30/00* (2012.01)
*G06Q 30/02* (2012.01)

(52) U.S. Cl.
CPC ......... *G06Q 30/01* (2013.01); *G06Q 30/0201* (2013.01); *G06Q 30/0202* (2013.01)

(58) Field of Classification Search
CPC . G06Q 30/01; G06Q 30/0201; G06Q 30/0202
See application file for complete search history.

(56) References Cited

U.S. PATENT DOCUMENTS

| | | | |
|---|---|---|---|
| 7,153,211 B2 | 12/2006 | Campaigne | |
| 7,877,266 B2 | 1/2011 | Brydon et al. | |
| 2004/0102995 A1 | 5/2004 | Boppana | |
| 2006/0143034 A1* | 6/2006 | Rothermel | G06Q 10/10 705/301 |
| 2007/0174110 A1 | 7/2007 | Andrews et al. | |
| 2007/0185727 A1* | 8/2007 | Ma | G06Q 30/0278 705/306 |
| 2008/0222630 A1* | 9/2008 | Taylor | G06Q 30/02 717/176 |
| 2009/0198686 A1 | 8/2009 | Cushman, II et al. | |
| 2010/0185968 A1 | 7/2010 | Hsu et al. | |
| 2011/0113057 A1 | 5/2011 | Lee et al. | |

(Continued)

OTHER PUBLICATIONS

Governing Operational Decisions in an Enterprise Scalable Way; IBM; Apr. 2013 p. 147.*

(Continued)

*Primary Examiner* — Victoria E Frunzi
(74) *Attorney, Agent, or Firm* — Fabian VanCott; Steven L. Nichols (57) ABSTRACT

Modifying a number of opportunities in a customer relationship management (CRM) system includes obtaining, from a CRM system, a number of opportunities, the opportunities representing a complex record structure in the CRM system, in which each of the opportunities captures a number of fields of metadata, comparing the metadata associated with the opportunities with a number of archived opportunity templates to create a comparison, analyzing the comparison to identify a number of patterns for the opportunities, and modifying, based on the number of patterns for the opportunities, the opportunities to create at least one new opportunity.

13 Claims, 7 Drawing Sheets

(56) References Cited

U.S. PATENT DOCUMENTS

| | | | |
|---|---|---|---|
| 2011/0246504 A1* | 10/2011 | Slater .................... | G06Q 10/00 |
| | | | 707/769 |
| 2012/0059767 A1 | 3/2012 | Uthmann | |
| 2012/0102036 A1 | 4/2012 | Parker, III et al. | |
| 2012/0278091 A1 | 11/2012 | Yaseen et al. | |
| 2013/0085838 A1 | 4/2013 | Tennenholtz et al. | |
| 2013/0085857 A1* | 4/2013 | Bax ....................... | G06Q 30/02 |
| | | | 705/14.57 |
| 2013/0218640 A1 | 8/2013 | Kidder | |
| 2014/0282101 A1* | 9/2014 | Beechuk ............... | H04W 4/003 |
| | | | 715/753 |
| 2015/0112755 A1* | 4/2015 | Potdar ................. | G06Q 30/0201 |
| | | | 705/7.29 |
| 2015/0170163 A1* | 6/2015 | Wagner .............. | G06Q 30/0201 |
| | | | 705/7.29 |
| 2015/0358303 A1* | 12/2015 | Hui ................... | G06F 17/30386 |
| | | | 726/4 |

OTHER PUBLICATIONS

List of IBM Patents or Patent Applications Treated as Related; Jun. 8, 2015.

List of IBM Patents or Patent Applications Treated as Related; Aug. 1, 2014.

https://web.archive.org/web/20120531014428/http://www.poltys.com/products/da_overview.html; May 2012.

http://www.poltys.com/en/products/CRMIntegration/crm_integration_overview.html; Aug. 2014.

* cited by examiner

MODIFYING A NUMBER OF OPPORTUNITIES IN A CUSTOMER RELATIONSHIP MANAGEMENT (CRM) SYSTEM

BACKGROUND

The present invention relates to modifying a number of opportunities, and more specifically, to modifying a number of opportunities in a customer relationship management (CRM) system.

A CRM system uses techniques and methods to gather, organize, automate, and synchronize sales, for marketing, customer service, and technical support. The CRM system stores this information in a database. Further, this information is retrieved from the database and analyzed to allow a company to better target various customers.

BRIEF SUMMARY

A method for modifying opportunities in a customer relationship management (CRM) system includes obtaining, from a CRM system, a number of opportunities, the opportunities representing a complex record structure in the CRM system, in which each of the opportunities captures a number of fields of metadata, comparing the metadata associated with the opportunities with a number of archived opportunity templates to create a comparison, analyzing the comparison to identify a number of patterns for the opportunities, and modifying, based on the number of patterns for the opportunities, the opportunities to create at least one new opportunity.

A system modifying a number of opportunities in a CRM system includes an obtaining engine, to obtain, from a CRM system, a number of opportunities, the opportunities representing a complex record structure in the CRM system, in which each of the opportunities captures a number of fields of metadata, a comparing engine, to compare the metadata associated with the opportunities with a number of archived opportunity templates to create a comparison, an analyzing engine, to analyze the comparison identify a number of patterns for the opportunities, a modifying engine, to modify, based on the number of patterns for the opportunities, the opportunities to create at least one new opportunity, and a storing engine to store the at least one new opportunity in the CRM system.

A computer program product includes a computer readable storage medium, the computer readable storage medium having computer readable program code embodied therewith. The computer readable program code having computer readable program code to compare metadata associated with a number of opportunities with a number of archived opportunity templates to create a comparison, analyze the comparison identify a number of patterns for the opportunities, modify, based on the number of patterns for the opportunities, the opportunities to create at least one new opportunity, and store the at least one new opportunity in a CRM system.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

The present specification describes a method and system for modifying a number of opportunities in a customer relationship management (CRM) system, such that a data structure for an opportunity has relevant resources assigned to it.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, a CRM system uses techniques and methods to organize, automate, and synchronize sales, for marketing, customer service, and technical support. This information that the CRM system gathers is stored in a database. Further, this information may be categorized as opportunities in the database. A user associated with a company may view the opportunities gather by the CRM system to allow the company to better target various customers.

Often, the CRM system contains thousands of opportunities. Further, some of the opportunities may be related to other opportunities. A user manually analyses all the opportunities to determine if some of the opportunities may be related to other opportunities. For example, the CRM system may include opportunity A, opportunity B, and thousands of other opportunities. The user manually analyses all the opportunities and determines opportunity A and opportunity B are related. In this example, opportunity A may be a product for a first customer that includes hardware X version two. Opportunity B may be a product for a second customer that includes hardware X version one. It may be useful to merge opportunity A and opportunity B so that a single set of resources is assigned to the opportunities. This may reduce the overhead for the opportunities. By merging opportunity A and opportunity B a new opportunity is created. In this example, resources are then assigned to the new opportunity.

Similarly, the CRM system may include opportunity C. In one example, opportunity C has grown large and diverse such that a single set of resources may not be able to effectively manage opportunity C. As a result, the user manually determines that it may be desirable to split opportunity C into two new opportunities. As a result, the user manually splits opportunity C into two new opportunities. These two new opportunities may each be assigned resources that were originally assigned to opportunity C, or one of the new opportunities may receive all resources that were assigned to opportunity C while the other new opportunities is assigned a new set of resources. However, with thousands of opportunities in the CRM system, manually analyzing all the opportunities in the CRM system to determine if one opportunity is related to another opportunity can be a burdensome task for the user.

The principles described herein include a system and a method for modifying opportunities in a CRM system. Such a system and method includes obtaining, from a CRM system, a number of opportunities, the opportunities representing a complex record structure in the CRM system, in which each of the opportunities captures a number of fields of metadata, comparing the metadata associated with the opportunities with a number of archived opportunity templates to create a comparison, analyzing the comparison to identify a number of patterns for the opportunities, and modifying, based on the number of patterns for the opportunities, the opportunities to create at least one new opportunity. Such a system and method allows opportunities to be split or merged, according to archived opportunity templates that have been developed. As a result, the new opportunities may be assigned resources according to the metadata such as social graphs of relationships, functions, organizations, members, social networking connections, resources, or a number of other areas.

In the specification and appended claims, the term "opportunities" is meant to be understood broadly as a complex record structure in a CRM system, in which each of the opportunities captures a number of fields of metadata. In one example, the opportunities may include a business's sales and/or interaction with current customers, future customers, or combinations thereof.

In the specification and appended claims, the term "archived opportunity template" is meant to be understood broadly as an example of an opportunity that associated with a number of defined characteristics. The archived opportunity template may include a recommended action for an opportunity that exhibits displayed in the archived opportunity template. The archived opportunity template may include historic data from other opportunities or may include future goals of an organization. The archived opportunity template may aid in identifying patterns for an opportunity, predict actions, and aid in assigning resources to newly created opportunities. For example, the archived opportunity template may recommend a division of an opportunity, taking into consideration such factors as historic opportunity observations and studied opinions as to recommended changes when an opportunity reaches a specific stage.

In the specification and appended claims, the term "metadata" is meant to be understood broadly as information that is associated with an opportunity. In one example, metadata for each of the opportunities includes a number of events related to the opportunities, a social graph of relationships, functions, organizations, members, social networking connections, resources, and a number of areas, or a combination thereof. Additionally, the metadata may include information useful to determine effective resource assignment for newly created opportunities derived from previous opportunities. Such information may include resources that were assigned to opportunities from which the newly created opportunity was derived, expertise of resources and staff with knowledge or social connections related to the newly created opportunities, development goals of resources or staff, business development, other information, or combinations thereof.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
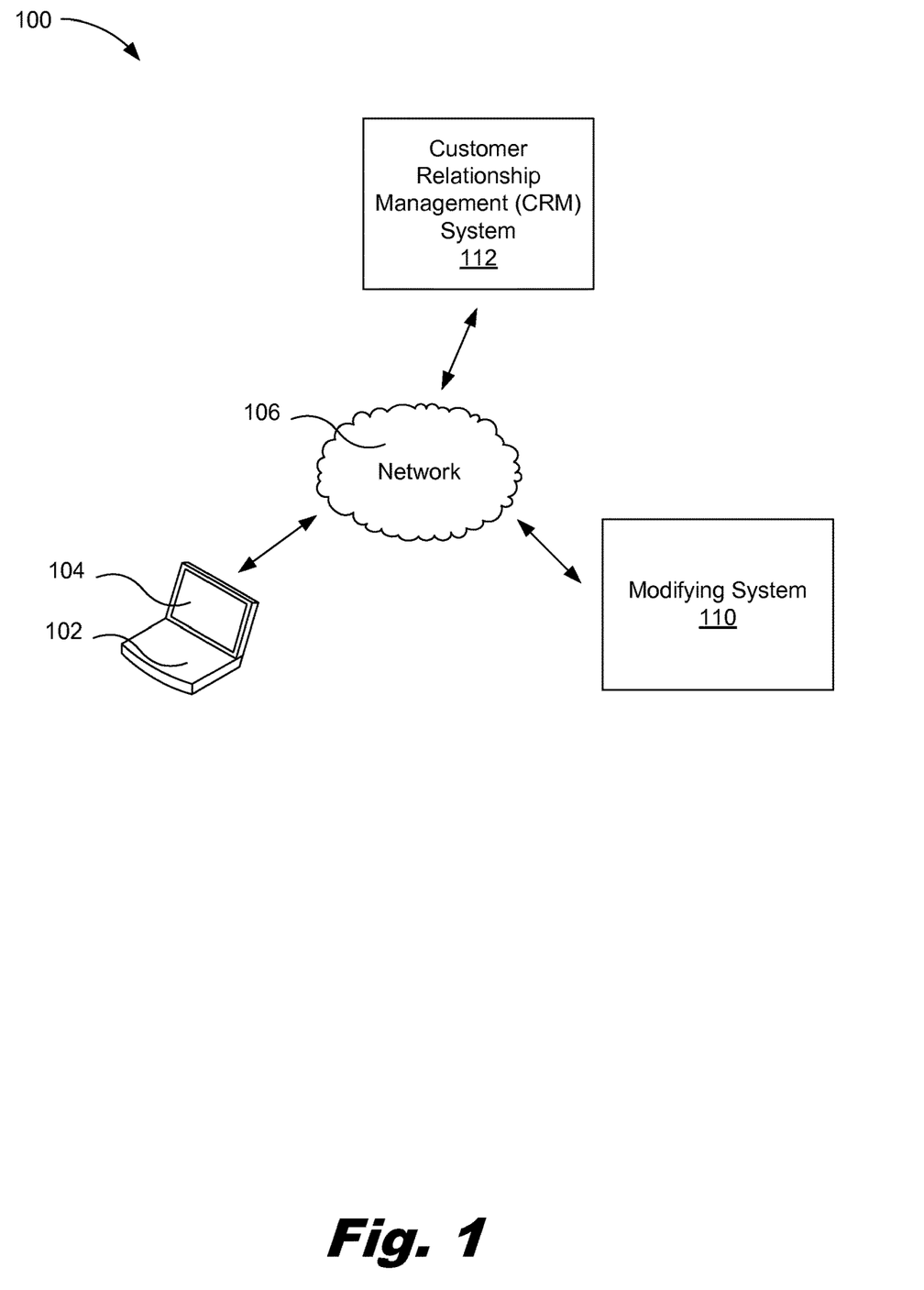
FIG. 1 is a diagram of an example of a system for modifying a number of opportunities in a customer relationship management (CRM) system, according to one example of principles described herein.

Referring now to the figures, FIG. 1 is a diagram of an example of a system for modifying a number of opportunities in a CRM system. As will be described below, a modifying system is in communication with a network to obtain, from a CRM system, a number of opportunities, the opportunities representing a complex record structure in the CRM system, in which each of the opportunities captures a number of fields of metadata. The modifying system compares the metadata associated with the opportunities with a number of archived opportunity templates to create a comparison. Further, the modifying system analyzes the comparison to identify a number of patterns for the opportunities. The modifying system modifies, based on the number of patterns for the opportunities, the opportunities to create at least one new opportunity.

As illustrated in FIG. 1, the system (100) includes a CRM system (112). In one example, the CRM system (112) is used as a model for managing a business's interactions with current and future customers. The CRM system (112) uses techniques and methods to organize, automate, and synchronize sales for marketing, customer service, and technical support. This information that the CRM system (104) gathers is stored in the CRM system's memory. Further, this information may be categorized as opportunities in the CRM system's memory. A user may view the opportunities gather by the CRM system (112) via a display (104) of a user device (102).

As illustrated in FIG. 1, the system (100) includes a modifying system (110). The modifying system (110) obtains, from the CRM system (112), a number of opportunities, the opportunities representing a complex record structure in the CRM system (112). Further, each of the opportunities captures a number of fields of metadata. As will be described in other parts of this specification, hundreds of fields of metadata may be associated with each opportunity.

Further, the modifying system (110) compares the metadata associated with the opportunities with a number of archived opportunity templates to create a comparison. In one example, the modifying system (110) creates at least one comparison.

The modifying system (110) analyzes the comparison to identify a number of patterns for the opportunities. In one example, the patterns may indicate an overlap of metadata for one of the opportunities and an archived opportunity template.

Further, the modifying system (110) modifies, based on the number of patterns for the opportunities, the opportunities to create at least one new opportunity. In one example, modifying, based on the number of patterns for the opportunities, the opportunities to create at least one new opportunity includes merging at least of the opportunities with another one of the opportunities in the CRM system (112) to create the at least one new opportunity. In another example, modifying, based on the number of patterns for the opportunities, the opportunities to create at least one new opportunity includes splitting at least one of the opportunities to create the at least one new opportunity. Further, the new opportunity may be displayed on the display (104). Such a system (100) allows opportunities to be split or merged, according to archived opportunity templates that have been developed. As a result, the new opportunities may be assigned resources according to the metadata such as social graphs of relationships, functions, organizations, members, social networking connections, resources, or a number of other areas. More information about the modifying system (110) will be described in later parts of this specification.

While this example has been described with reference to the modifying system being located over the network, the modifying system may be located in any appropriate location. For example, the modifying system may be located in a user device, a database, a CRM system, other locations, or combinations thereof.

Figure 2:
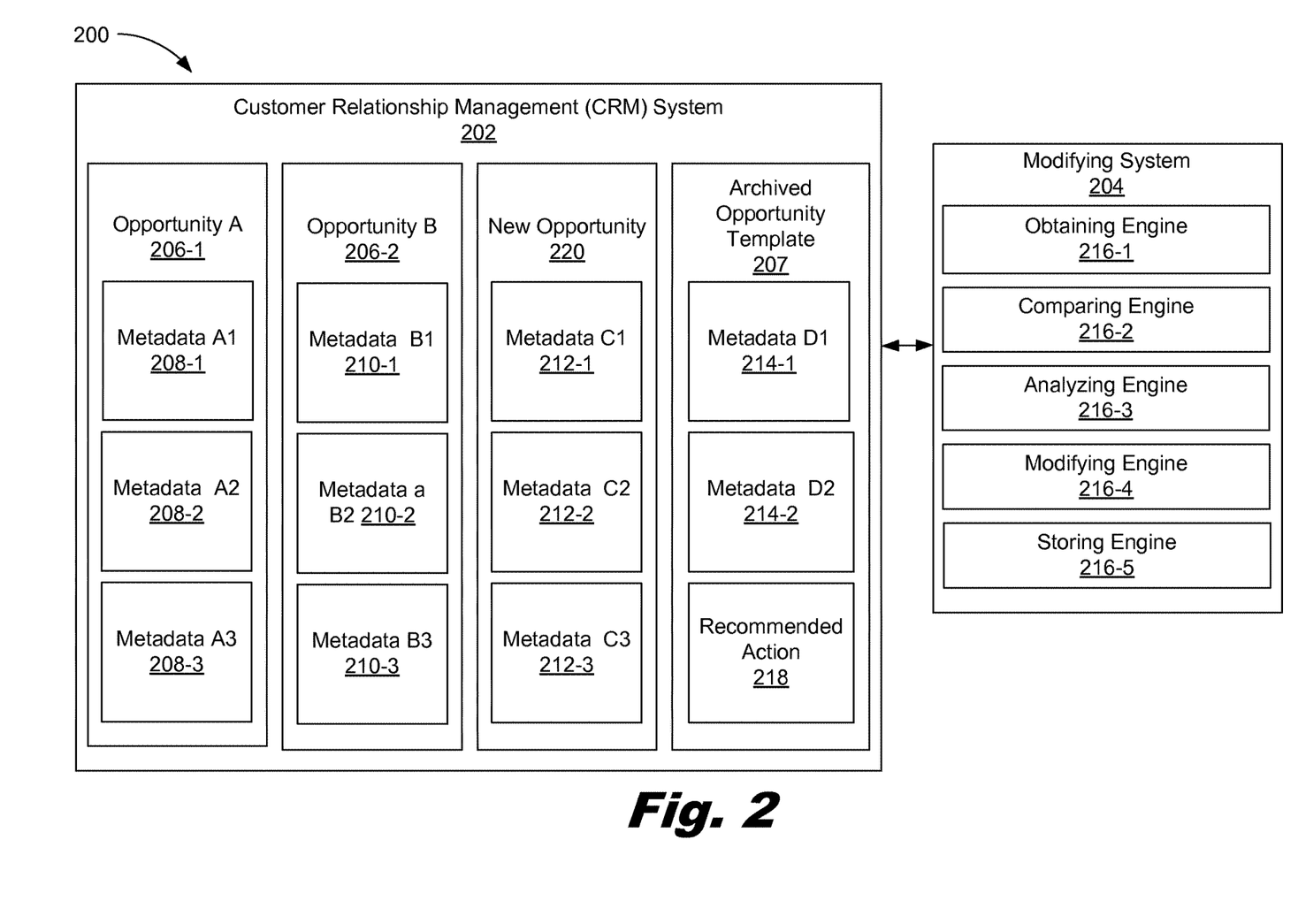
FIG. 2 is a diagram of an example of a system for modifying a number of opportunities in a CRM system, according to one example of principles described herein.

FIG. 2 is a diagram of an example of a system for modifying a number of opportunities in a CRM system, according to one example of principles described herein. As mentioned above, a modifying system is in communication with a network to obtain, from a CRM system, a number of opportunities, the opportunities representing a complex record structure in the CRM system, in which each of the opportunities captures a number of fields of metadata. The modifying system compares the metadata associated with the opportunities with a number of archived opportunity templates to create a comparison. Further, the modifying system analyzes the comparison to identify a number of patterns for the opportunities. The modifying system modifies, based on the number of patterns for the opportunities, the opportunities to create at least one new opportunity.

As illustrated in FIG. 2, the system (200) includes a CRM system (202). In this example, the CRM system (202) includes a number of opportunities (206) and an archived opportunity template (207). As mentioned above, the opportunities represent a complex record structure in the CRM system (202), in which each of the opportunities captures a number of fields of metadata. In this example, the opportunities (206) may include opportunity A (206-1) and opportunity B (206-2). In one example, the archived opportunity template (207) may include metadata D1 (214-1) and metadata D2 (214-2), as well as a recommended action (218). In one example, if an opportunity (206) includes a pattern resembling metadata D1 (214-1) and metadata D2 (214-2), the recommended action (218) may be implemented.

In one example, the opportunities (206) include metadata that is associated with each of the opportunities (206). For example, opportunity A (206-1) includes metadata A1 (208-1), metadata A2 (208-2), and metadata A3 (208-3). Opportunity B (206-2) includes metadata B1 (210-1), metadata B2 (210-2), and metadata B3 (210-3). Further, archived opportunity template (207) includes metadata D1 (214-1), metadata D2 (214-2).

The metadata (208 and 210) for each of the opportunities (206) may include a design specification, a platform specification, a fixpack specification, a version specification, an OS specification, a time line, a risk, a cost, a performance result, an integration middleware specification, members associated with the opportunities, an upgrade, a product, a staging, other metadata, or combinations thereof.

The metadata (214) associated with the archived opportunity template (207) may also include a design specification, a platform specification, a fixpack specification, a version specification, an OS specification, a time line, a risk, a cost, a performance result, an integration middleware specification, members associated with the opportunities, an upgrade, a product, a staging, other metadata, or combinations thereof. The metadata associated with the template may also include descriptions of a number of events related to previous opportunities, a description of social graphs of relationships, functions, organizations, members, social networking connections, resources, a number of areas, or a combination thereof.

As illustrated in FIG. 2, the system (200) includes a modifying system (204). The modifying system (204) includes a number of engines (216). The engines (216) refer to a combination of hardware and program instructions to perform a designated function. Each of the engines (216) may include a processor and memory. The program instructions are stored in the memory and cause the processor to execute the designated function of the engine. As illustrated, the modifying system (204) includes an obtaining engine (216-1), a comparing engine (216-2), an analyzing engine (216-3), a modifying engine (216-4), and a storing engine (216-5).

In one example, the obtaining engine (216-1) obtains, from the CRM system (202), a number of opportunities (206), the opportunities (206) representing a complex record structure in the database, in which each of the opportunities captures a number of fields of metadata (208 and 210). In this example, opportunity A (206-1) and opportunity B (206-2) are obtained by the obtaining engine (216-1).

In one example, opportunity A (206-1) is a sales opportunity in Siebel that captured a closed deal for a customer that includes product version eight, enhancement version seven. Associated with opportunity A (206-1) is metadata (208) that includes things such as version information, fixpack information, platform information, issues discerned and solved and solutions to these and areas of potential risk, among others.

In this example, opportunity B (206-2) is a customer from two years back and captures a deal for product version seven, enhancement version six. This customer is about to upgrade to product version eight, enhancement version seven as indicated by the metadata (210).

As mentioned above, the modifying system (204) includes a comparing engine (216-2). The comparing engine (216-2) compares the metadata (208 and 210) associated with the opportunities (206) to an archived opportunity template (207) to create a comparison. In one example, the comparison aids in identifying patterns for the opportunities (206). As will be described in below, the analyzing engine (216-3) analyzes the comparison to identify patterns. For example, if opportunity A (206-1) has a strong resemblance to the archived opportunity template (207), opportunity A (206-1) may be modified as recommended by the archived opportunity template (207). By comparing the metadata (208) for opportunity A (206-1) with the archived opportunity template (207), patterns of success and failures may be determined by the analyzing engine (216-3).

For example, the archived opportunity template (207) may be identified as potentially relevant to opportunity A (206-1) even though opportunity A (206-1) and the archived opportunity template (207) are different in terms of scope. In one example, opportunity A (206-1) may be larger than the archived opportunity template (207). Further, there may be an underlying footprint in the archived opportunity template (207) that can be seen in opportunity A (206-1). As a result, the archived opportunity template recommends the recommended action (218). The recommended action (218) may include creating at least one new opportunity based on opportunity A (206-1). Additional engines may assign resources to the at least one new opportunity (220), or may provide those resources as a list of recommendations to the user of the modifying system (204).

As illustrated, the modifying system (204) includes the analyzing engine (216-3). The analyzing engine (216-3) analyzes the comparison to identify a number of patterns for the opportunities. For example, if opportunity A (206-1)

indicates patterns of success and failures, and opportunity B (206-2) is six months behind opportunity A (206-1), a pattern may be identified.

As illustrated, the modifying system (204) includes the modifying engine (216-4). The modifying engine (216-4) modifies, based on the number of patterns for the opportunities, the opportunities to create at least one new opportunity (220). In one example, this may be accomplished by applying the recommended action (218) of the archived opportunity template (207). The recommended action (218) may recommend or invoke a division or split of opportunity A (206-1) to create a new opportunity (220), possibly including leaving opportunity A (206-1) in existence, or replacing opportunity A (206-1) with a number of new opportunities (206). In another example, the recommended action (218) may recommend to merge opportunity A (206-1) with opportunity B (206-2) to create the new opportunity (220).

The modifying system (204) includes the storing engine (216-5). The storing engine (216-6) stores the at least one new opportunity (220) in the CRM system (202). In this example, the new opportunity may include metadata C1 (212-1), metadata C2 (212-2), and metadata C3 (212-3). Further, the new opportunity (220) may be assigned resources based on the successes and failures of opportunity A (206-1) and the archived opportunity template (218). In one example, the storing engine (216-5) stores updates to opportunity A (206-1) regarding any changes based on the recommended action (218).

Figure 3:
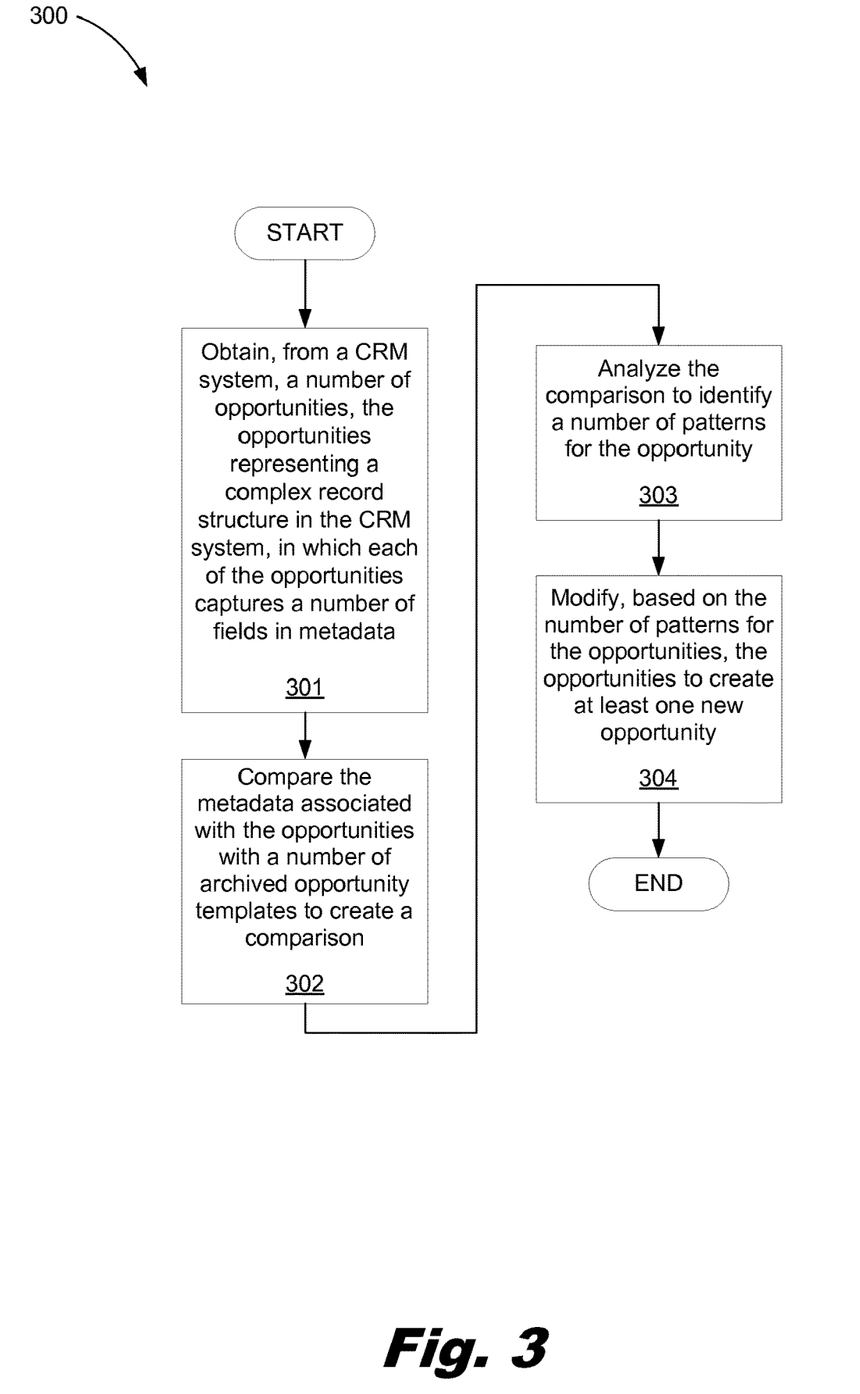
FIG. 3 is a flowchart of an example of a method for modifying a number of opportunities in a CRM system, according to one example of principles described herein.

FIG. 3 is a flowchart of an example of a method modifying a number of opportunities in a CRM system, according to one example of the principles described herein. In one example, the method (300) may be executed by the modifying system (100) of FIG. 1. In other examples, the method (300) may be executed by another system (i.e. system 200, system 500, and system 600). In this example, the method (300) includes obtaining (301), from a CRM system, a number of opportunities, the opportunities representing a complex record structure in the CRM system, in which each of the opportunities captures a number of fields of metadata, comparing (302) the metadata associated with the opportunities with a number of archived opportunity templates to create a comparison, analyzing (303) the comparison to identify a number of patterns for the opportunities, and modifying (304), based on the number of patterns for the opportunities, the opportunities to create at least one new opportunity.

As mentioned above, the method (300) includes obtaining (301), from a CRM system, a number of opportunities, the opportunities representing a complex record structure in the CRM system, in which each of the opportunities captures a number of fields of metadata. As mentioned above, a CRM system is used as a model for managing a business's interactions with current and future customers. The CRM system uses techniques and methods to organize, automate, and synchronize sales for marketing, customer service, and technical support. In one example, the CRM system may be a classical CRM system that monitors sources such as current customers and potential future customers to gather information to better target various customers. The classical CRM system traditionally includes a one-way communication between a business and a customer.

In another example the CRM system may be a social CRM system that monitors sources, such as social media sources. In this example, the social CRM system's strategy is based around customer engagement and interactions, with transactions being a byproduct. In one example, the Social CRM system may use a philosophy and a business strategy, supported by a technology platform, business rules, workflow, processes and social characteristics, designed to engage the customer in a collaborative conversation in order to provide mutually beneficial value in a trusted and transparent business environment. Further, the social CRM system includes applications in marketing, customer service and sales, including peer-to-peer customer support, idea management, market research, product launch, and brand reputation management.

In this example, the social CRM system is a back-end process and system for managing customer relationships and data in an efficient and process-centric way. The social CRM system is able to understand the business's challenges that are to be solved and then solve the business's challenges. Further, the social CRM system may be one component of developing a social or collaborative business, both internally and externally.

Regardless of whether the CRM system is a classical CRM system or a social CRM system, it is used to gather information about opportunities and populate the CRM system's memory with the information gathered about the opportunities. Once the CRM system's memory is populated, the method (300) can obtain the opportunities from the CRM system.

As mentioned above, the method (300) includes comparing (302) the metadata associated with the opportunities with a number of archived opportunity templates to create a comparison. In one example, opportunities can largely have common footprints and be at different maturity levels. For example, opportunities within a brand may be derived from approximately thirty products developed in the brand. Usually, customer opportunities will include some of these products. In a CRM system with thousands of opportunities, the overlap on decisions customers make in products they choose will be high. Differences in these places of overlap can be attributed to metadata. In one example, the metadata for each of the opportunities may include a design specification, a platform specification, a fixpack specification, a version specification, an operating system (OS) specification, a time line, a risk, a cost, a performance result, an integration middleware specification, a list of members associated with the opportunities, an upgrade, a product, a staging, a number of events related to the opportunities, a social graph of relationships, functions, organizations, members, social networking connections, resources, a number of areas, other metadata, or combinations thereof.

In one example, the CRM system includes hundreds of thousands of opportunities that have both implicit and explicit sub-patterns that can be derived. As will be described below, once derived, these sub-patterns can be related to adjacent opportunities for the purposes of comparison, extrapolation, motivating change, ascertaining risk, and avoiding failure, among others.

In one example, comparing the metadata associated with the opportunities with a number of archived opportunity templates creates a comparison to expose patterns and recommended actions for an opportunity. For example, an opportunity may be focused on a customer purchasing consumer products. As the customer's business grows, the customer may request technology consulting services. This new area, combined with the growth and volume in the business transactions with the account, may make the splitting of the opportunity an effective CRM transaction. The opportunity may be compared to an archived opportunity template, exposing the growth in volume and areas, and associate with that data a recommended action of splitting the opportunity.

In another example, the archived opportunity template may be used to detect that two opportunities have merged into a single opportunity. This may occur if a business purchases another business, where both businesses were stored as an opportunity. A similar result may occur in a large business that undergoes an organizational change where a number of business units are combined. These events may make combining the opportunity into a single new opportunity an effective way to manage the customer relationship.

As mentioned above, the method (300) includes analyzing (303) the comparison to identify a number of patterns for the opportunities. In one example, an opportunity may be growing and provide that the opportunity has become sufficiently large to split into a number of new opportunities. In another example, a number of opportunities with a particular business may be combined due to changes in market dynamics that reduce the need for one or more of the areas involved in the opportunities. An opportunity or group of opportunities may match a number of different archived opportunity templates, an analysis may be used to determine which of the opportunity templates may be invoked.

In this way, the method (300) analyzes a number of different archived opportunity templates to determine a recommended action or set of actions. The method (300) may further consider resources available to be assigned to the newly created number of opportunities, or business considerations of the CRM database user.

In one example, analyzing the comparison to identify a number of patterns for the opportunities may include analyzing metadata. In one example, the metadata includes a number of events related to the opportunities, a social graph of relationships, functions, organizations, members, social networking connections, resources, a number of areas, or a combination thereof, in determining resource availability and assignment for a number of newly created opportunities.

Further, the method (300) uses correlations between opportunities and the archived opportunity template to exhibit similar criteria. Further, the method (300) identifies ways in which an opportunity may be split into a number of new opportunities. Similarly, the method (300) identifies a number of opportunities to merge to create a new opportunity.

Further, analyzing the comparison to identify a number of patterns for the opportunities may include identifying, based on metadata of events that have occurred, a resource associated with an opportunity, and determining a score, the score representing a relationship between the opportunity and the resource. This information may be used in assigning resources to at least one new opportunity that may be created. A resource associated with an opportunity may include resources that are associated with areas of the opportunity. For instance, an opportunity may involve an area of technology. An example of an area may be computer memory. A resource associated with computer memory may be examined with greater detail for knowledge in the area, geographic location, availability, and social connectedness to individuals associated with the opportunity.

Further, analyzing the comparison, to identify the number of patterns for the opportunities may further include displaying, based on the score for the resource, a list of resources that are available to be assigned to an opportunity. In one example, the list of resources may be manually analyzed by a user via a user device.

As mentioned above, the method (300) includes modifying (304), based on the number of patterns for the opportunities, the opportunities to create at least one new opportunity. In one example, modifying, based on the number of patterns for the opportunities, the opportunities to create the at least one new opportunity includes merging at least of the opportunities with another one of the opportunities in the CRM system to create the at least one new opportunity. For example, the method (300) may merge the complex record structure in the CRM system and capture the metadata for the combined opportunities.

In another example, modifying, based on the number of patterns for the opportunities, the opportunities to create at least one new opportunity includes splitting at least one of the opportunities to create the at least one new opportunity. For example, the method (300) may split the complex record structure in the CRM system, split different portions of metadata, duplicating metadata to associate with each new opportunity, or combinations thereof. Further, the modifying (block 304), may inform a user of changes that are proposed to the opportunities, requesting that the user invoke the change, approve the change, or make the change.

In one example, a single opportunity may be modified to create a plurality of new opportunities. The CRM system may be modified by the plurality of new opportunities being stored in the CRM system, while the single opportunity is removed.

In another example, the complex record structure is modified directly to create at least one new opportunity. In this manner, the modification of an existing opportunity may create at least one new opportunity structure, while reducing the number of structures to be duplicated or allocated.

A number of opportunities may be combined to create a new opportunity by combining metadata not present in all opportunities, preserving a number of metadata that the opportunities may share, and discarding redundant metadata. Resources may be assigned to the new opportunity based on a score of the resource associated with the new opportunity. This score may include criteria such as previous involvement with individuals associated the new opportunity, expertise in areas associated with the new opportunity, future plans for the resource in areas associated with the new opportunity, a social graph of relationships, social networking connections, or similar metadata.

In one example, the method (300) may provide a notice to a user of the proposed changes to the CRM system. Such notice may be interactive through an interface, or may include an asynchronous notice such as email. The notice may solicit the user to approve a change in the CRM system. The approval may be an explicit request to approve, or may be accomplished by providing the user with the ability to invoke the change directly.

Figure 4:
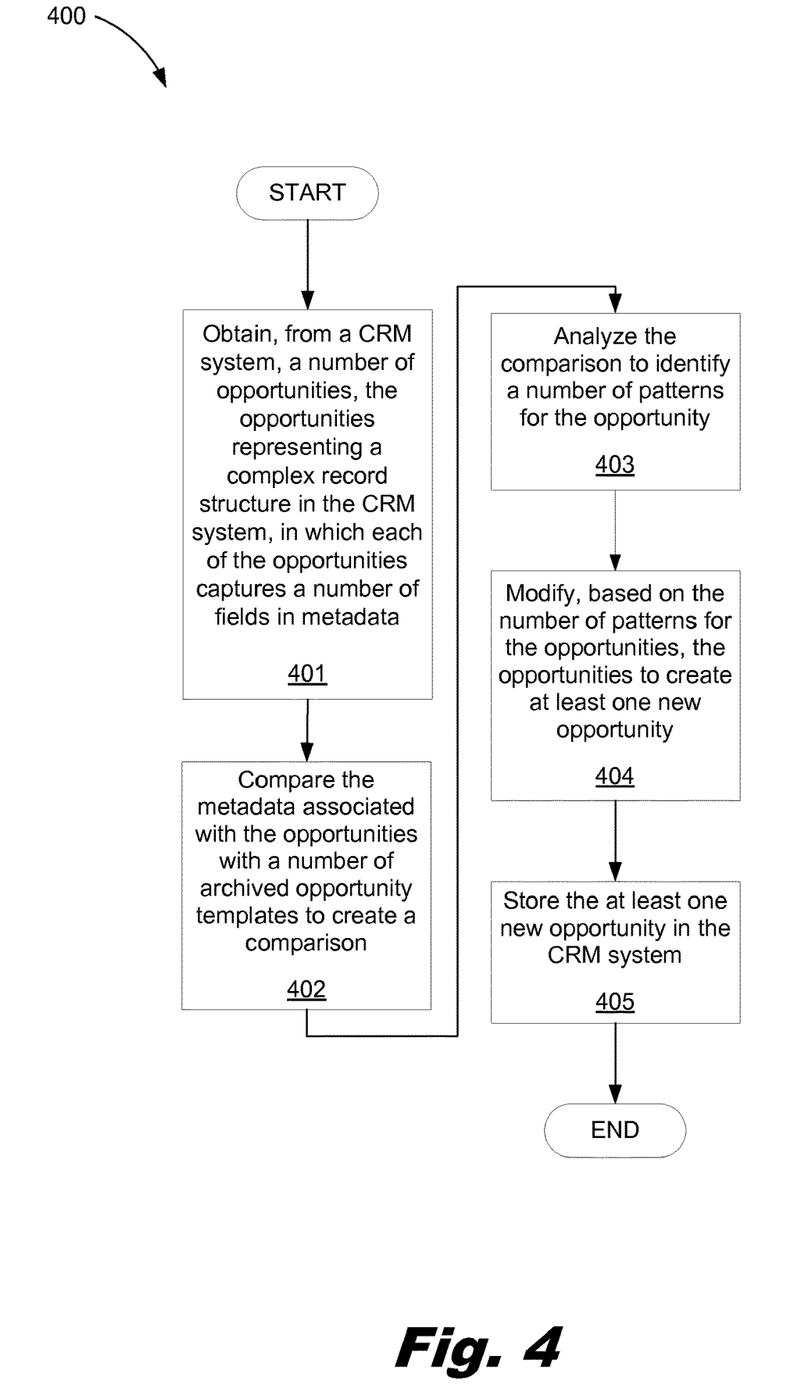
FIG. 4 is a flowchart of an example of a method for modifying a number of opportunities in a CRM system, according to one example of principles described herein.

FIG. 4 is a flowchart of an example of a method modifying a number of opportunities in a CRM system, according to one example of the principles described herein. In one example, the method (400) may be executed by the modifying system (100) of FIG. 1. In other examples, the method (400) may be executed by another system (i.e. system 200, system 500, and system 600). In this example, the method (400) includes obtaining (401), from a CRM system, a number of opportunities, the opportunities representing a complex record structure in the CRM system, in which each of the opportunities captures a number of fields of metadata, comparing (402) the metadata associated with the opportunities with a number of archived opportunity templates to create a comparison, analyzing (403) the comparison to identify a number of patterns for the opportunities, modifying (404), based on the number of patterns for the opportunities, the opportunities to create at least one new opportunity, and storing (405) the at least one new opportunity in the CRM system.

As mentioned above, the method (400) includes storing the new opportunity in the CRM system. In one example, the method (400) may store the at least one new opportunity in the CRM system such that the new opportunity is accessible to future use.

Figure 5:
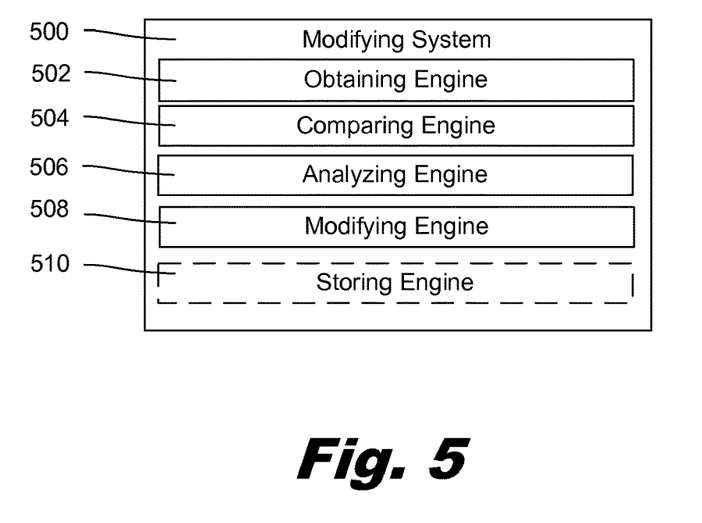
FIG. 5 is a diagram of an example of a modifying system, according to the principles described herein.

FIG. 5 is a diagram of an example of a modifying system (500), according to the principles described herein. The modifying system (500) includes an obtaining engine (502), a comparing engine (504), an analyzing engine (506), and a modifying engine (508). In this example, the system (500) also includes a storing engine (510). The engines (502, 504, 506, 508, 510) refer to a combination of hardware and program instructions to perform a designated function. Each of the engines (502, 504, 506, 508, 510) may include a processor and memory. The program instructions are stored in the memory and cause the processor to execute the designated function of the engine.

The obtaining engine (502) obtains, from a CRM system, a number of opportunities, the opportunities representing a complex record structure in the database, in which each of the opportunities captures a number of fields of metadata. In one example, the obtaining engine (502) obtains, from the CRM system, the opportunities according to factors such as an event, a time, a function, other factors, or combinations thereof. Further, in one example, the obtaining engine (502) obtains opportunities that have yet to be analyzed by the modifying system of FIG. 1.

The comparing engine (504) compares metadata associated with a number of opportunities with an archived opportunity template to create a comparison. By comparing an opportunity, metadata, and an archived opportunity template, the modifying system (500) may identify a situation in a number of opportunities that may benefit from a recommended action. In one example, the metadata for each of the opportunities may include a number of events related to the opportunities, a social graph of relationships, functions, organizations, members, social networking connections, resources, a number of areas, or combination thereof.

The analyzing engine (506) analyzes the comparison to identify number of patterns for the opportunities. In one example, the analyzing engine (506) analyzes the comparison to identify the number of patterns for the opportunities by identifying, based on the metadata, a resource associated with at least one of the opportunities, determining a score for the resource associated with at least one of the opportunities, the score representing a relationship between the opportunities and the resource, and displaying, based on the score for the resource, a list of resources that are available to be assigned to an opportunity. In one example, the analyzing engine (504) analyzes metadata for resources associated with an area related to an opportunity.

The modifying engine (508) modifies, based on the number of patterns for the opportunities, the opportunities to create at least one new opportunity. In one example, the modifying engine (508) modifies, based on the number of patterns for the opportunities, the opportunities to create at least one new opportunity by merging at least of the opportunities with another one of the opportunities in the CRM system to create the at least one new opportunity. In another example, the modifying engine (508) modifies, based on the number of patterns for the opportunities, the opportunities to create at least one new opportunity by splitting at least one of the opportunities to create the at least one new opportunity. The creation of the at least one new opportunity may involve assigning resources to that opportunity, based on a number of events related to the new opportunity, a social graph of relationships, functions, organizations, members, social networking connections, resources already assigned to the new opportunity, a number of areas, or combination thereof.

The storing engine (514) stores the at least one new opportunity in the CRM system. In one example, the storing engine (514) stores in the new opportunity with associated metadata in the CRM system. In one example, the storing engine (514) updates the metadata associated with one opportunity. In another example, the storing engine (514) updates the metadata associated with several opportunities.

Figure 6:
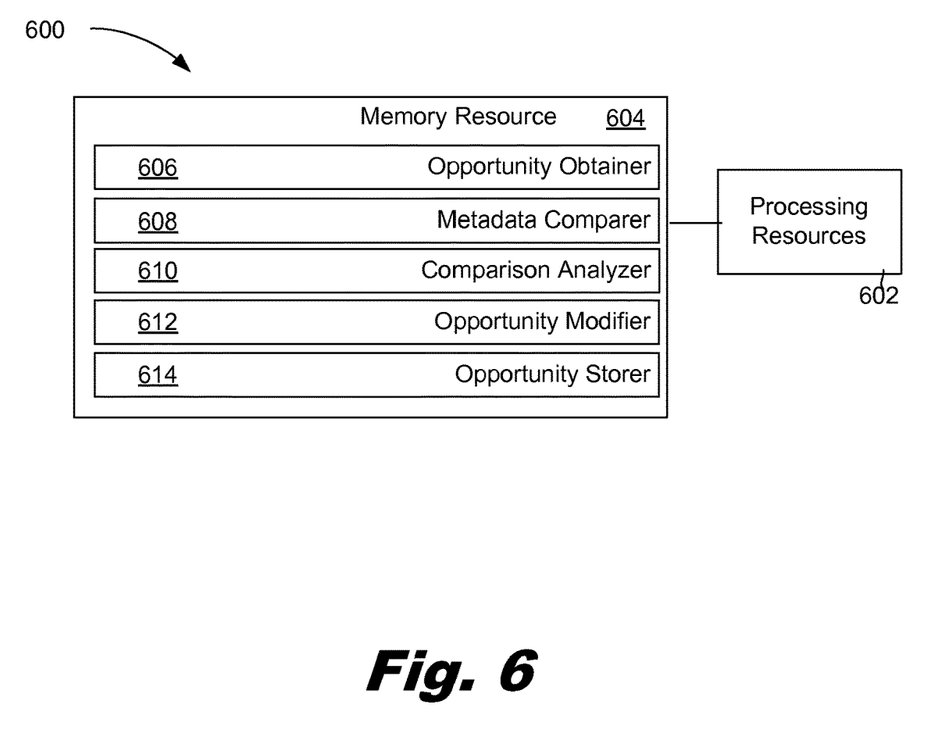
FIG. 6 is a diagram of an example of a modifying system, according to the principles described herein.

FIG. 6 is a diagram of an example of a modifying system (600), according to the principles described herein. In this example, the modifying system (600) includes processing resources (602) that are in communication with memory resources (604). Processing resources (602) include at least one processor and other resources used to process programmed instructions. The memory resources (604) represent, generally, any memory capable of storing data, such as programmed instructions or data structures used by the notifying system (600). The programmed instructions shown stored in the memory resources (604) include an opportunity obtainer (606), a metadata comparer (608), a comparison analyzer (610), an opportunity modifier (612), and an opportunity storer (614).

The memory resources (604) include a computer readable storage medium that contains computer readable program code to cause tasks to be executed by the processing resources (602). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or other types of memory, or combinations thereof.

The opportunity obtainer (606) represents programmed instructions that, when executed, cause the processing resources (602) to obtain, from a CRM system, a number of opportunities, the opportunities representing a complex record structure in the database, in which each of the opportunities captures a number of fields of metadata. The metadata comparer (608) represents programmed instructions that, when executed, cause the processing resources (602) to compare the metadata associated with the opportunities with a number of archived opportunity templates to create a comparison.

The comparison analyzer (610) represents programmed instructions that, when executed, cause the processing resources (602) to analyze the comparison to identify a number of patterns for the opportunities. The opportunity modifier (612) represents programmed instructions that, when executed, cause the processing resources (602) to modifying, based on the number of patterns for the opportunities, the opportunities to create at least one new opportunity. The opportunity storer (614) represents programmed instructs that, when executed by the processing resource (612), to store the at least one new opportunity in the CRM system.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries, may be accessed from a remote location over a network connection, while the programmed instructions are located locally. Thus, a modifying system (600) may be implemented on a user device, on a server, on a collection of servers, or on a combination thereof.

The modifying system (600) of FIG. 6 may be part of a general purpose computer. However, in alternative examples, the modifying system (600) is part of an application specific integrated circuit.

Figure 7:
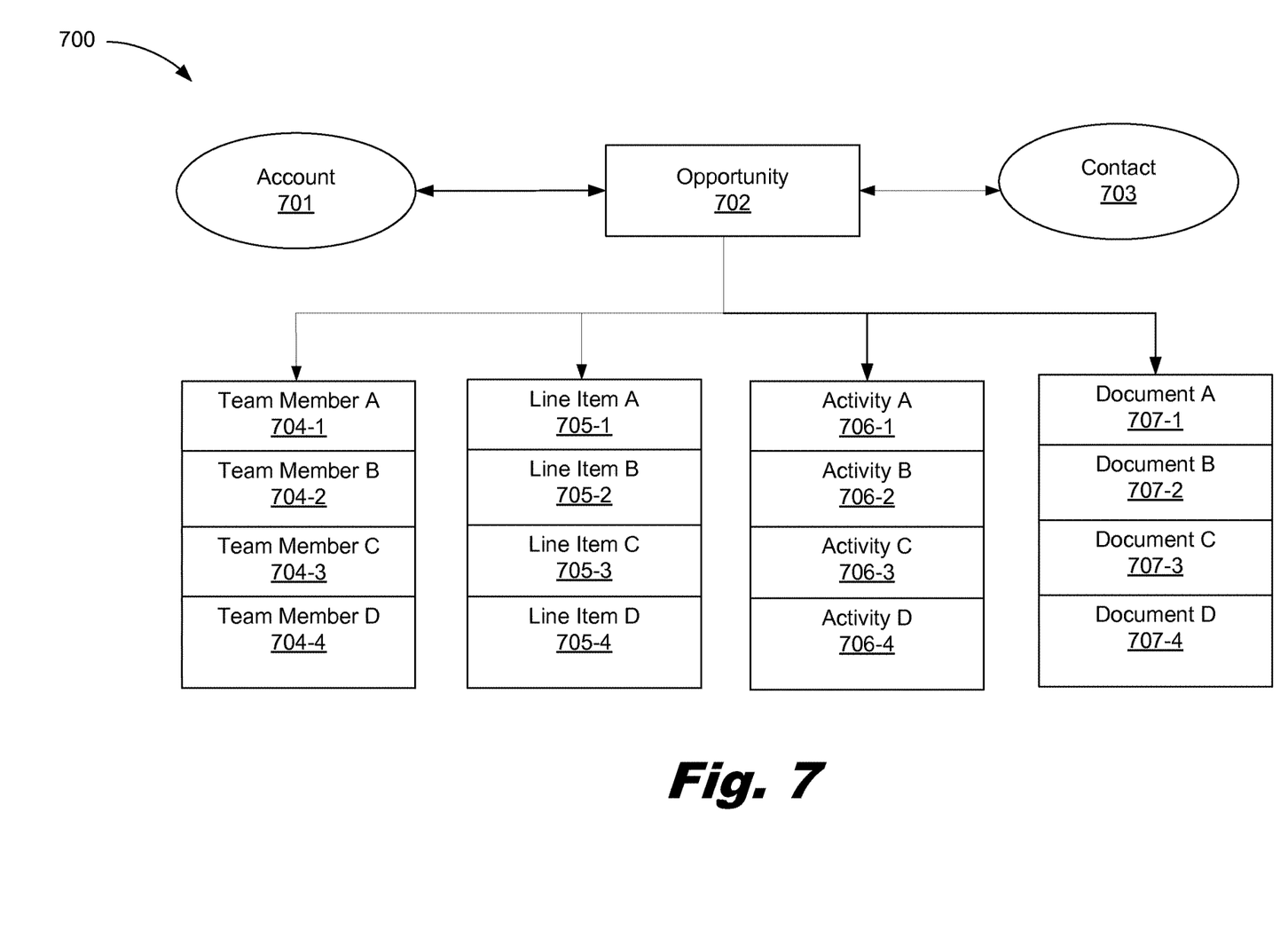
FIG. 7 is a diagram of an opportunity structure with associated metadata, according to the principles described herein

FIG. 7 is a diagram of an opportunity structure (700) with associated metadata, according to the principles described herein. As mentioned above, the modifying system of FIG. 1 obtains, from a CRM system, a number of opportunities. In one example, the opportunities represent a complex record structure in the CRM system. Further, the opportunities capture a number of fields of metadata.

As illustrated in FIG. 7 the opportunity structure (700) may contain an opportunity (702). As mentioned above, the opportunity (702) represents a complex record structure in the CRM system and captures a number of fields of metadata. In this example, the opportunity (702) is associated with an account (701) and a contact (703).

In one example, the account (701) associated with the opportunity (702) may include a number of financial transactions that share billing information. Further, the account (701) may represent an area of a transaction, may indicate a pattern of purchases, or combinations thereof.

As mentioned above, the opportunity (702) may include a number of contacts (703) associated with the opportunity (702). The contact (703) may be a single person at a customer site or may consist of a number of individuals at a customer site. Further, the contact (703) may be a person who has authority to approve expenses on behalf of a customer or may be a person responsible for securing such approval.

Further, the opportunity (702) may be associated with a number of fields of metadata. As illustrated, the fields of metadata may include team members (704), line items (705), activities (706) and documents (707).

In one example, the team members (704) may include an assignment, such as a number of sales representatives, support engineers, sales managers, or vice-presidents of sales areas. Team members (704) may fill a variety of roles in developing and supporting the opportunity (702).

In one example, the line items (705) may represent future actions to be taken associated with the opportunity. Future actions may include providing information, documentation, follow-ups, or other events.

In one example, the activities (706) may include information regarding potential or actual sales, contacts, information, or events associated with an opportunity. An analysis of activities (706) may allow the modifying system of FIG. 1 to determine patterns of events and to inform decisions related to future activities.

As illustrated, the opportunity (702) may be associated with the documents (707). In one example, the documents (707) may provide instances of contracts, support information, technical manuals, or other information that is related to the opportunity (702).

As the opportunity (702) may be developed to include more team members (704), line items (705), activities (706) and documents (707), it may reach a point that a modifying system may split the opportunity (702) to create a number of new opportunities. As will be described in FIG. 8, the opportunity (702) may be split due to a business event related to the activity, such as a business creating a number of new additional businesses. Further, a number of activities may cause the modifying system (FIG. 1, 110) to split the opportunity.

Figure 8:
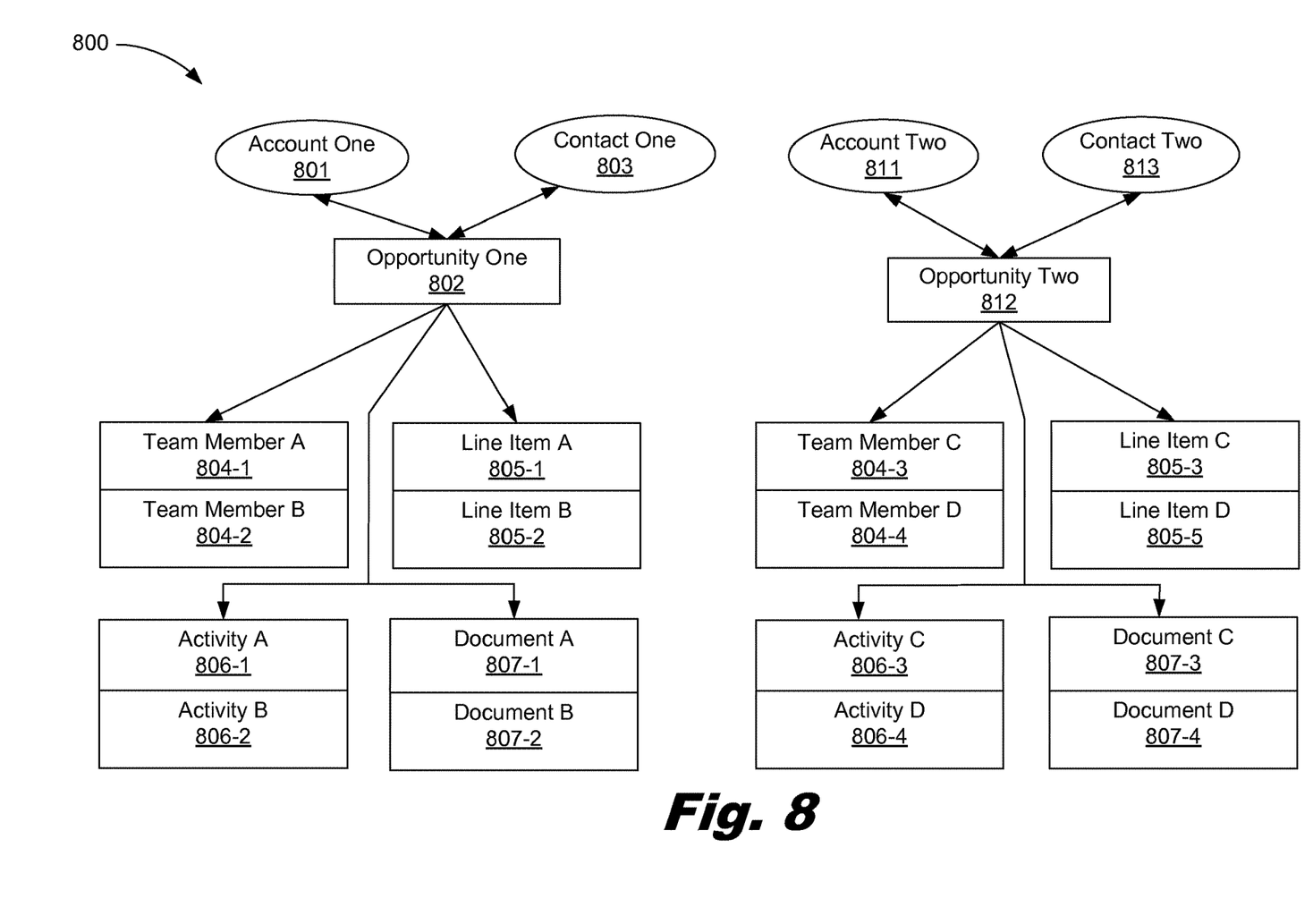
FIG. 8 is an example of a diagram for splitting an opportunity to create a new opportunity, according to the principles described herein.

FIG. 8 is an example of a diagram for splitting an opportunity to create a new opportunity according to the principles described herein. As mentioned above, the modifying system of FIG. 1 modifies, based on the number of patterns for the opportunities, the opportunities to create at least one new opportunity. In one example, the modifying system of FIG. 1 modifies, based on the number of patterns for the opportunities, the opportunities to create at least one new opportunity by splitting at least one of the opportunities to create the at least one new opportunity.

As mentioned above, an opportunity may be split due to a business event related to the activity, such as a business creating a number of new additional businesses. FIG. 8 illustrates the opportunity (702) of FIG. 7 being modified by the modifying system of FIG. 1. As illustrated, the opportunity (702) of FIG. 7 is split to create at least two opportunities. In this example, opportunity one (802) and opportunity two (812).

In one example, a portion of the metadata associated with the opportunity (702) of FIG. 7 may be assigned to opportunity one (802). Further, a portion of the metadata associated with the opportunity (702) of FIG. 7 may be assigned to opportunity two (812).

In one example, in creating opportunity one (802) or two (812), the modifying system of FIG. 1 may reuse metadata, or may create additional metadata to complete the resource assignment to opportunity one (802) and/or opportunity two (812). For example, opportunity one (802) may be assigned account one (801) and contact one (803). Opportunity one (802) may be assigned a number of team members (804-1 and 804-2), Further, opportunity one (802) may be assigned a number of line items (805-1 and 805-2), activities (806-1, 806-2), and documents (807-1 and 807-2).

Further, opportunity two (812) may be assigned account two (811) and contact two (813). Similarly, opportunity two (812) is assigned team members (804-3 and 804-4) due to the social connections and expertise of the team members (804) in relation to the new opportunities (802, 812). Further, opportunity two (812) may be associated with a set of line items (805-3 and 805-4), activities (806-3 and 806-4) and documents (807-3 and 807-4).

The modification described above is an example of a modification of an opportunity that may occur according to the principles described herein. This example is for illustrative purposes only. Other examples of opportunity modifications may occur according to the principles described herein.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A system for modifying a number of opportunities in a customer relationship management (CRM) system, the system comprising a computer with a processor, memory and a network interface, the computer, with the processor and memory, implementing all of:
an obtaining engine, to obtain, from a customer relationship management (CRM) system, data for a number of opportunities, wherein each of the opportunities is represented by a record structure in the CRM system, including a number of fields of metadata;
a comparing engine, to compare the metadata associated with the opportunities with a number of archived opportunity templates to create a comparison that indicates, based on the templates, whether a corresponding opportunity is to be split into multiple opportunities or merged with another opportunity to reduce a total number of opportunities in the CRM system, each archived opportunity template containing more data than an opportunity from the CRM so as to indicate through the comparison whether a corresponding opportunity is to be split into multiple opportunities or merged with another opportunity to reduce a total number of opportunities in the CRM system; and
a modifying engine, to modify, based on the comparison of the opportunity metadata to the archived opportunity templates, the record structures of the opportunities to create at least one new opportunity thereby automatically updating an opportunity database of the CRM system, wherein the modifying engine, based on the comparison, selectively splits at least one opportunity to create two opportunities including a new opportunity, thereby making the CRM system self-expanding, or selectively merges at least two opportunities into a single new opportunity, thereby making the CRM system self-regulating, including discarding redundant metadata in a merged record for the new opportunity; and a storing engine to store the at least one new opportunity in the CRM system.

2. The system of claim 1, in which the metadata comprises a number of events related to the opportunities, a social graph of relationships, functions, organizations, members, social networking connections, resources, a number of areas, or combination thereof.

3. The system of claim 1, in which the modifying engine creates the at least one new opportunity by merging at least one of the opportunities with another one of the opportunities in the CRM system to create the at least one new opportunity.

4. The system of claim 1, in which the modifying engine creates the at least one new opportunity by splitting at least one of the opportunities to create the at least one new opportunity.

5. The system of claim 1, further comprising an analyzing engine, in which analyzing engine analyzes the comparison to identify a number of patterns for the opportunities by:
identifying, based on the metadata, a resource associated with at least one of the opportunities; and
determining a score for the resource associated with at least one of the opportunities, the score representing a relationship between the opportunities and the resource.

6. The system of claim 5, in which the analyzing engine further analyzes the comparison to identify the number of patterns for the opportunities by displaying, based on the score for the resource, a list of resources that are available to be assigned to the opportunity.

7. A computer program product for modifying a number of opportunities in a customer relationship management (CRM) system, comprising: a tangible computer readable storage medium, said tangible computer readable storage medium comprising computer readable program code embodied therewith, said computer readable program code comprising program instructions that, when executed, causes a processor to:
compare metadata associated with a number of opportunities with a number of archived opportunity templates to create a comparison that indicates, based on the templates, whether a corresponding opportunity is to be split into multiple opportunities or merges with another opportunity to reduce a total number of opportunities in the CRM system, each archived opportunity template containing more data than an opportunity from the CRM system so as to indicate through the comparison whether a corresponding opportunity is to be split into multiple opportunities or merged with another opportunity to reduce a total number of opportunities in the CRM system;
analyze the comparison to identify a number of patterns for the opportunities;
modify, based on the comparison, the opportunities to create at least one new opportunity by selectively splitting at least one opportunity to create two opportunities including a new opportunity, thereby making the CRM system self-expanding, or selectively merging at least two opportunities into a single new opportunity, thereby making the CRM system self-regulating, including discarding redundant metadata in a merged record for the new opportunity; and store the at least one new opportunity in a customer relationship management (CRM) system.

8. The product of claim 7, further comprising computer readable program code comprising program instructions that, when executed, cause said processor to obtain, from the CRM system, the number of opportunities, the opportunities representing a record structure in the CRM system, in which each of the opportunities captures a number of fields of the metadata.

9. The product of claim 7, in which the metadata comprises a number of events related to the opportunities, a social graph of relationships, functions, organizations, members, social networking connections, resources, a number of areas, or combination thereof.

10. The product of claim 7, further comprising computer readable program code comprising program instructions that, when executed, cause said processor to merge at least of the opportunities with another one of the opportunities in the CRM system to create the at least one new opportunity.

11. The product of claim 7, further comprising computer readable program code comprising program instructions that, when executed, cause said processor to split at least one of the opportunities to create the at least one new opportunity.

12. The product of claim 7, further comprising computer readable program code comprising program instructions that, when executed, cause said processor to identify, based on the metadata, a resource associated with at least one of the opportunities and determine a score for the resource associated with at least one of the opportunities, the score representing a relationship between the opportunities and the resource.

13. The product of claim 12, further comprising computer readable program code comprising program instructions that, when executed, cause said processor to display, based on the score for the resource, a list of resources that are available to be assigned to an opportunity.

* * * * *